United States Patent [19]
Yoshiura et al.

[11] Patent Number: 6,079,043
[45] Date of Patent: Jun. 20, 2000

[54] MAGNETIC DISK APPARATUS

[75] Inventors: Tsukasa Yoshiura, Hirakata; Yasushi Ayaki, Neyagawa; Yuji Nagaishi, Daito, all of Japan

[73] Assignee: Matsushita Electric Industrial Co., Ltd., Osaka-fu, Japan

[21] Appl. No.: 09/086,023

[22] Filed: May 28, 1998

[30] Foreign Application Priority Data

May 30, 1997 [JP] Japan ................................ 9-141928

[51] Int. Cl.$^7$ .......................... H03M 13/00; G11C 29/00
[52] U.S. Cl. ...................... 714/758; 714/768; 360/77.02; 360/77.04; 360/77.05; 369/275.3; 369/275.5
[58] Field of Search .................................. 714/755–758, 714/767–774; 360/48, 51, 53, 77.01–77.08, 78.11, 135; 369/275.1–275.3, 275.5

[56] References Cited

U.S. PATENT DOCUMENTS

| | | |
|---|---|---|
| 4,881,232 | 11/1989 | Sako et al. ................................ 714/755 |
| 5,153,787 | 10/1992 | Sidman ................................ 360/77.05 |
| 5,274,509 | 12/1993 | Buch ......................................... 360/48 |
| 5,305,159 | 4/1994 | Sakai et al. ......................... 360/77.02 |
| 5,570,340 | 10/1996 | Lee et al. ............................. 369/275.3 |
| 5,586,108 | 12/1996 | Hoshino ............................... 369/275.3 |
| 5,907,448 | 5/1999 | Watanabe et al. .................. 360/77.04 |
| 5,995,308 | 11/1999 | Assouad et al. .......................... 360/53 |

FOREIGN PATENT DOCUMENTS

| | | |
|---|---|---|
| 63-308772 A1 | 12/1988 | Japan . |
| 08147607 | 6/1996 | Japan . |

*Primary Examiner*—Emmanuel L. Moise
*Attorney, Agent, or Firm*—Akin, Gump, Strauss, Hauer & Feld, L.L.P.

[57] ABSTRACT

The present invention is a magnetic disk apparatus which is provided with means for dividing a large amount of data such as video data into segments with error correction code added thereto and further dividing the data including the error correction code into recording segments, while being capable of efficiently correcting errors even for a sector size of large unit and processing sectors of variable length.

17 Claims, 10 Drawing Sheets

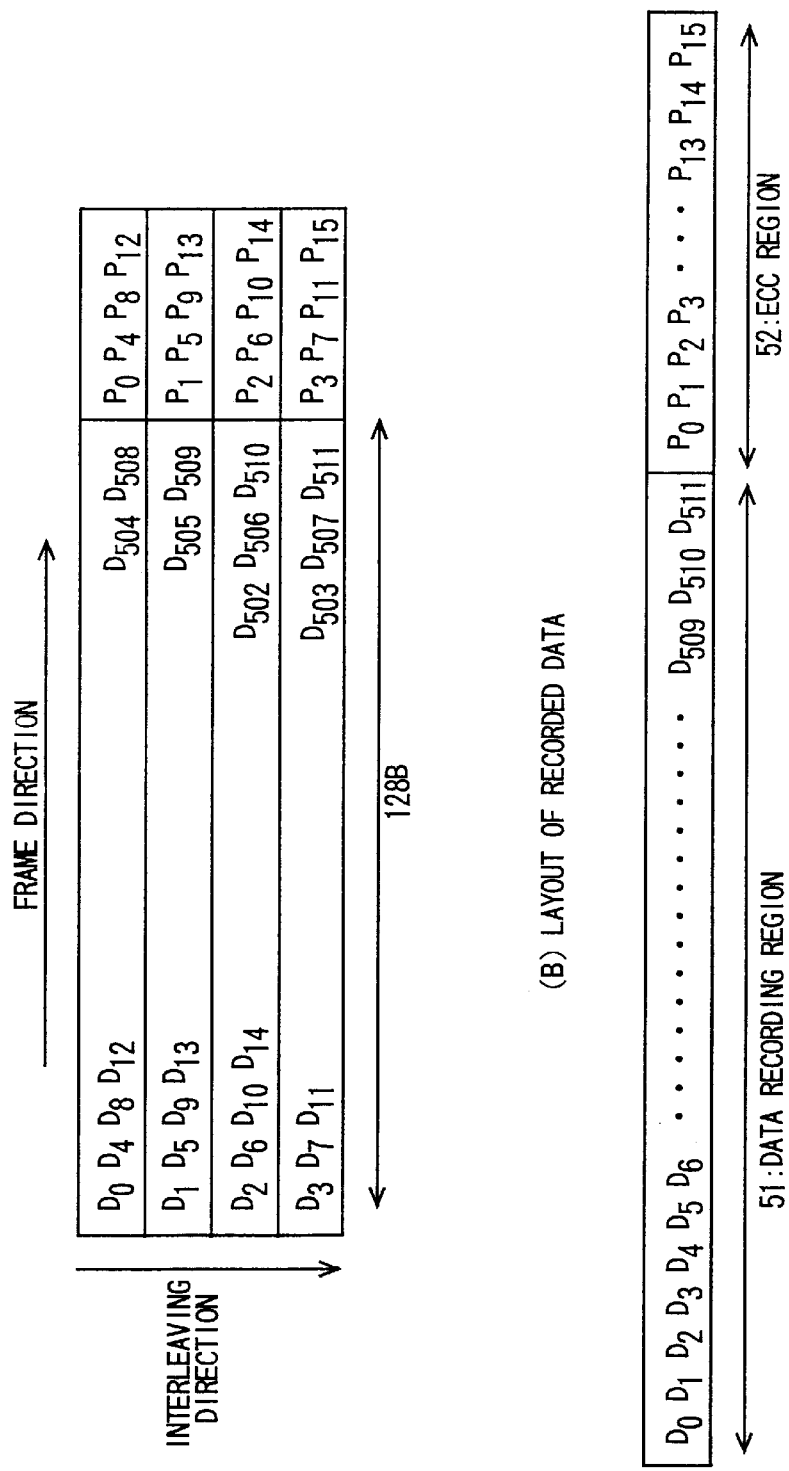
F I G. 10

MAGNETIC DISK APPARATUS

BACKGROUND OF THE INVENTION

The present invention relates to a magnetic disk apparatus of embedded servo system, wherein the same disk surface carries both servo information and user data, and particularly to a magnetic disk apparatus which is capable of efficiently recording and reproducing data in such applications that data is recorded and reproduced in a large unit as video data.

Magnetic disk apparatuses which utilize magnetic disks, particularly hard disk apparatuses (HDD) have recently been advancing at an amazing rate toward higher speed and larger storage capacity. As a result, magnetic disk apparatuses having storage capacities of 10 GB per unit have been commercialized and utilized for recording and reproducing AV data as well, in nonlinear video editing system or the like. When using AV data, HDD has been required to have, in addition to a larger storage capacity, improved random access capability and securing proper recording and reproducing speed to prevent edited video data from being interrupted.

The hard disk apparatus of the prior art mentioned above will be described below by using reference to the accompanying drawings.

FIG. 6 shows the recording system employed in the hard disk of the prior art as a recording medium. The hard disk shown in FIG. 6 is the recording medium wherein data is recorded by a system called embedded servo system. In FIG. 6, recording zones 41 are formed by dividing the disk surface in the radial direction into a plurality of annular regions so that a larger amount of data can be recorded in a zone having longer circumference. Each of the recording zones 41 comprises a plurality of tracks, and every track in one recording zone 41 has the same storage capacity for recorded data. Such recording system is the embedded servo recording system.

In FIG. 6, a servo region 42 holds information recorded therein to position a magnetic head (not shown in the drawing) on a track in the prior art. The hard disk is divided in the rotating direction into a plurality of recording segments 40 having substantially the same angles. One of the recording segments 40 is further divided into the servo region 42 and a data region 43. Number of the divisions is determined according to the tracking control performance of the magnetic head in locating tracks. One of design parameters of tracking control system for locating the tracks is gain-crossover frequency which is set in a range from about 400 Hz to 600 Hz in many cases of hard disk apparatus.

Off-track information is detected at a sampling frequency determined by the rotating speed of the disk and the number of divisions of the recording segment 40. The sampling frequency is set to about ten times the gain-crossover frequency. For example, when the gain-crossover frequency is 500 Hz and the disk rotating speed is 5400 rpm (i.e. 90 Hz), the number of dividing of recording segment 40 is about 56 (≈500/90) sections. On the condition that the recording segment 40 is divided into 56 sections, the sampling frequency is set at 90×56=5040(Hz), which is about ten times the gain-crossover frequency.

FIG. 7 is a drawing to explain the servo region 42 in the hard disk apparatus (HDD) of the prior art. The servo region 42 includes a synchronization region 45 located at the head thereof, for the purpose of pretreatment necessary to reproduce data. The synchronization region 45 holds recorded pattern for detecting such information as AGC (auto gain control), PLL (phase lock loop) and the servo region.

An identifier region 46 holds a track identifying code, which is required for carrying out seek control, recorded therein. Recently the number of hard disk apparatuses (HDD) provided with MR head (magnetoresistive head) has been increasing. Position of an MR head must be a little different between times when recording and reproducing, depending on the track. For this reason, such a unique identifier code has been recorded in the data region 43 that indicates the position in each sector which is the unit of recording and reproduction. In the case of the MR head, however, because the magnetic head must be shifted a little during recording, the identifier code becomes off-track, thus making it impossible to reproduce. Therefore, increasing HDDs provided with the MR head employ non-ID system wherein a code which is unique over the disk surface is recorded in the identifier region 46 and is used as the identifier region.

A burst region 47 in the servo region 42 holds a pattern recorded therein which is capable of detecting the excursion of the magnetic head from position with a high sensitivity.

In FIG. 6 mentioned previously, the arc-shaped data region 43 is usually divided into a plurality of sectors 44 so that user data can be recorded and reproduced in the unit of 512B (byte).

FIG. 8 is a drawing to explain the layout of the sectors 44 in the data region 43 of the prior art. In FIG. 8, (A) shows the layout of the sectors in an outer zone in the data region 43 and (B) shows the layout of the sectors in an inner zone in the data region 43. As shown in FIG. 8, the outer zone is longer than the inner zone and therefore holds larger amount of data recorded therein. In the case of this example, data of three sectors plus is recorded in the data region 43 in the outer zone, while data of two sectors plus is recorded in the inner region. Total recording capacity of the data region 43 is determined by the recording/reproducing characteristics of the magnetic disk as the recording medium and of the magnetic head, and is set so that the recording efficiency is maximized.

It is preferable to set the recording density of the data region 43 so that an integer number of sectors 44 are included in the data region 43, in that no sector is divided into fractions. However, as shown in FIG. 8, recording efficiency is improved by employing such a layout as some sectors 44 lie over adjacent servo regions 42. While each zone includes a plurality of tracks, sectors 44 are arranged in every zone similarly by taking the specified servo region 42 as the start point.

Now a procedure of making access to the sector 44 in the conventional apparatus will be described below.

In the hard disk apparatus of the prior art, information indicating how many sectors per track are formed in each zone can be recognized by a CPU incorporated in the apparatus by using such means as recording in ROM. Because the identifier 46 of the servo region 42 shown in FIG. 7 includes a code which is unique over the disk surface, the hard disk apparatus is capable of making access to any desired one of the servo regions 42. The hard disk apparatus also has the layout information of the sectors 44 in each of the data regions 43 in the form of a table stored in the ROM. Thus the hard disk apparatus is capable of making access to any desired one of the sectors 44 by using the information described above. Because the layout information of the sectors 44 is the same for different data regions 43 in a zone, it suffices to provide a table for each zone.

FIG. 9 shows the detailed structure of the sectors 44 formed in the data region 43 of the prior art.

The first servo region 42 is followed by a pattern which is required by an AGC circuit and is recorded in an AGC region 48. The AGC circuit is a circuit that maintains the amplitude of data reproduction signal constant after being amplified. Because an off-track error is detected by using the amplitude of the reproduction signal of the burst region 47 (FIG. 7) included in the servo region 42, the AGC circuit must be stopped at least in the burst region 47. Therefore the AGC region 48 is necessary for the restoration time of the AGC circuit which is required to reproduce data.

The AGC region 48 is followed by a synchronization region 49. The synchronization region 49 is a region required for clock synchronization of recorded data. In the case of a hard disk apparatus which employs the PRML (partial response maximum likelihood) recording system which has recently been put in commercial use, reproduction waveform is equalized by using a filter for circuit thereby to improve the reproduced data. In some hard disk apparatuses, the equalization parameter is determined by learning from the reproduction waveform. In such a hard disk apparatus, a pattern required for the learning is recorded in the synchronization region 49.

Next to the synchronization region 49, a DAM (data address mark) region 50 is provided. The DAM region 50 indicates the start point of user data. The data is recorded in next data recording region 51 with bit serial format and the reproduced data is processed in the unit of byte which usually consists of eight bits. Therefore, the DAM region 50 is important also for converting bit data into byte.

The data recording region 51 in the hard disk apparatus of the prior art has such a configuration as data is recorded in the fixed unit of 512B. Recorded in an ECC (error correcting code) region 52 is a code capable of detecting and correcting errors by using parity data recorded in the ECC region 52, even when the error is in the data recording region 51. A GAP region 53 is a region provided for preventing the head of the second sector indicated with numeral 83 from being destroyed by overwriting in the head of the second sector 83 due to variation in the rotation of a motor or the like when recording in the first sector indicated with numeral 82. The first sector 82 comprises from the synchronization region 49 through the GAP region 53 as shown in the drawing, and the next second sector 83 has the same configuration. The third sector 84 has a configuration which is different from those of the first sector 82 and the second sector 83 because the data region 51 lies over adjacent servo regions 42. In the data region 51 of the third sector 84, data of 512B is divided into predetermined two fractions, with the data in the first fraction being written before the servo region 42 as shown in the drawing. At this time, in order to prevent the servo region 42 from being destroyed by recording of data, the GAP region 53, having a function equivalent to that of the GAP region 53 provided at the end of the second sector 83, is provided before the servo region. The other divided fraction is placed after the servo region 42, although data is recorded first in the AGC region 48, the synchronization region 49 and the DAM region 50, and thereafter the rest of the data is recorded, because the regions for the AGC process, clock synchronization and byte synchronization are necessary.

FIG. 10 is a drawing to explain a method of generating error correction code in the hard disk apparatus of the prior art. In FIG. 10, (A) shows the method of generating error correction code by using the conventional reed-solomon code, and (B) shows the layout of recorded data in the hard disk.

As shown in (A) of FIG. 10, recorded data of 512 bytes from $D_0$ through $D_{511}$ are arranged successively in the unit of four bytes in the interleaving direction and are divided into four frames. Then for the user data of 128 bytes in the frame direction of each frame, parity codes $P_0 P_1, \ldots, P_{15}$ for error correction of four bytes are generated and arranged as shown in (A) of FIG. 10. In case the 4-byte error correction codes are generated as described above, errors can be corrected even when the 128 bytes in the frame direction and the 4 bytes of error correction code, 132 bytes in total, include an error of 2 bytes.

(B) of FIG. 10 shows the layout of data recorded on the disk surface. The data layout recorded on the disk surface is such that $D_0, D_1, \ldots, D_{511}$ are recorded in the data region 51 followed by the error correction codes recorded in the ECC region 52 in the order of $P_0, P_1, \ldots, P_{15}$.

Recently, as the storage capacities of hard disks increase, hard disks are increasingly used to store video data of nonlinear video editing system, video camera or the like. In such uses, for example, in case of motion picture data of JPEG format, it is desirable to control the recording and reproduction in the unit of frame. However, since the unit of recording and reproducing data in the conventional hard disk is fixed to 512B, it has been necessary to control the recording length for one frame in the unit of 512B in the application system. For example, when video data of one frame is divided into 640 segments in the horizontal direction and into 480 segments in the vertical direction while each segment is represented by one byte for each of red (R), green (G) and blue (B) color information, 640×480×3= 921600 bytes of data is required for every frame. When recording this amount of data in a disk, it is common to reduce the amount of data by using a compression technique such as motion picture JPEG. When data is compressed to $\frac{1}{10}$, for example, the amount of video data becomes 92160 bytes per frame. Thus data recorded in the conventional hard disk is controlled in the unit of 92160/512=180 sectors.

Recently, as the recording density of the hard disk increases, pit cells of recorded data has been becoming smaller. As a result, effects of unevenness and missing magnetic material on the magnetic disk are becoming conspicuous. Consequently, data errors have been increasing and S/N ratio has been decreasing due to smaller bit cells of recorded data, resulting in lower data quality. Also such a problem has been increasingly experienced as the speed of recording or reproducing data decreases due to the retry process, namely the operation of reading over erroneous data. In order to overcome such problems, error correction procedure is improved in many apparatuses. Efficiency of error correction can be improved by processing data in a larger unit. The hard disk apparatus of the prior art has a limitation in achieving efficient error correction process because the sector size is fixed to 512B. The magnetic disk apparatus of the present invention is capable of correcting errors efficiently even for a large sector size such as video data, thereby improving the reliability of data, and is further capable of easily processing sectors of variable length.

BRIEF SUMMARY OF THE INVENTION

An object of the present invention is to solve the problems described above and to provide a magnetic disk apparatus having a recording/reproducing system suitable for recording and reproducing data such as video data in the unit of large amount of data, which records and reproduces data satisfactorily even when the recording medium has defects, and is capable of suppressing the decrease in recording and reproducing speed.

In order to achieve the object described above, the magnetic disk apparatus of the present invention comprises:

a disk medium having a data region for magnetically recording and reproducing user data and a servo region for positioning a magnetic head which records and reproduces the user data, and both regions being provided on the same plane; and sector processing means having an error correction code generator which generates error correction codes based on a product code and records or reproduces data for each sector size which is the unit of recording and reproducing the user data.

The magnetic disk apparatus of the present invention is provided with sector processing means which records or reproduces data for each sector that is the unit of recording and reproducing data with respect to an external device, and the sector processing means is provided with an error correction code generator which generates error correction codes based on product code.

The magnetic disk apparatus of the present invention is capable of correcting errors efficiently even for a large sector size such as video data, thereby improving the reliability of data, and is further capable of easily processing sectors of variable length.

The present invention provides a magnetic disk apparatus having a recording and reproduction system capable of setting the video frame length to one sector. Since the video frame length varies depending on the compression system and resolution in this recording and reproduction system, it is desirable to be capable of accommodating variable video frame length. According to the present invention, a magnetic disk apparatus having the recording and reproduction system capable of accommodating variable sector length can be provided.

Also, according to the recording and reproduction system of the present invention, the problem of complicated control of access to the hard disk due to the fixed sector size of 512B in the conventional hard disk apparatus can be solved. For example, in the case of a hard disk having storage capacity of 10GB, number of sectors becomes as large as 10GB/512B=19531250. When processing video data in such a large unit as the video data described above, data can be recorded and reproduced in the unit of 180 sectors. In this case, such video data can be recorded and reproduced by controlling 10GB/(512×180)=108507 blocks of data. As a result, according to the present invention, number of sectors to be controlled can be reduced by two orders of magnitude.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 10 is the schematic illustration for explaining error correction code generating method of the magnetic disk apparatus of the prior art.

It will be recognized that some or all of the Figures are schematic representations for purposes of illustration and do not necessarily depict the actual relative sizes or locations of the elements shown.

DETAILED DESCRIPTION OF THE INVENTION

Now a preferred embodiment of the magnetic disk apparatus of the present invention will be described below by taking reference to the accompanying drawings.

Embodiment 1

Figure 1:
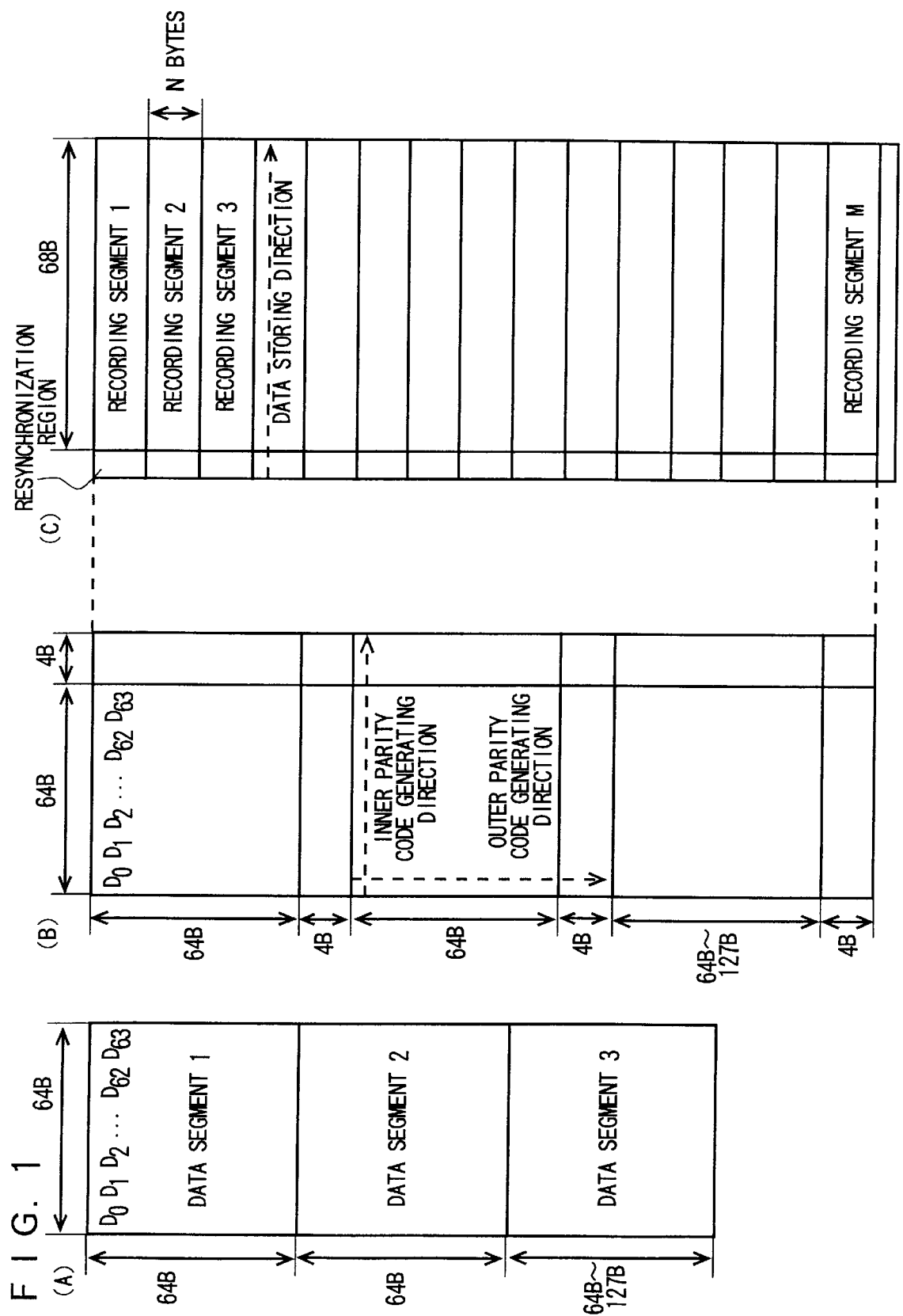
FIG. 1 is a schematic illustration for explaining recording data generating method of a magnetic disk apparatus according to first embodiment of the present invention.

A hard disk apparatus of the first embodiment of the magnetic disk apparatus of the present invention will be described below. FIG. 1 explains the error correction method and recording method in the hard disk apparatus of the first embodiment.

(A) of FIG. 1 shows a method of dividing data into blocks in order to apply error correction to user data blocks. (B) of FIG. 1 shows a method of generating error correction codes. (C) of FIG. 1 shows the unit of recording.

In the case of data such as motion pictures, it is convenient to record and reproduce data in the unit of, for example, picture frame. In the description that follows, it is assumed that the amount of data of one picture frame is 15040B (byte). When the sector size is variable, it can be controlled in the hard disk apparatus by providing means for setting the sector size in advance by means of an external apparatus and means for recording the data in a specified place of the disk or a nonvolatile memory such as flash ROM. Sector length which is the unit of recording and reproduction of the conventional hard disk is 512B, and the amount of data of one picture frame is 15040B. Therefore, sector length which is the unit of recording and reproducing with an external apparatus is set to 15040B. When data of 15040B is transferred from the external apparatus to the hard disk apparatus of the first embodiment, the hard disk apparatus first divides the data into segments.

In the hard disk apparatus of the first embodiment, such a case will be described below that the segment size is 64B in the horizontal direction and 64B in the vertical direction, namely 64B×64B=4096B.

When the sector length is 15040B, the sector is first divided into a segment 1 and a segment 2, both having fixed length of 4096B, and a segment 3 having a size of 15040B−4096×2=6848B, as shown in (A) of FIG. 1.

When dividing the sector, the size of segments is set to have fixed length of 4096B so that the last segment size is no smaller than one segment size and smaller than twice the segment size, to prevent the degree of redundancy of the error correction code from increasing. As for the error correction code in the case of the first embodiment, 4-byte error correction code is given as an inner parity code for 64-byte data from $D_0$ through $D_{63}$ in the order of data input of data segment 1 as shown in (B) of FIG. 1. When the segment is divided as described above, sectors of variable length can be processed in the unit of 64B. Since the size of the segment 3 is 6848B when the sector length shown in (A) of FIG. 1 is 15040B as described above, the segment 3 includes 107 sets of 64B data. When the sector has a size less than twice the segment size, the sector is handled as one segment without dividing, and it is made possible to accommodate small sector size. When data is divided into segments, error correction code of the product code is generated and applied. As for the error correction code in the case of the first embodiment, 4-byte error correction code is given as an inner parity code for 64-byte data from $D_0$ through $D_{63}$ in the order of data input of data segment 1 as shown in (B) of FIG. 1.

When the inner parity code is generated, 4-byte error correction code is generated as an outer parity code for 64-byte data in the vertical direction. Since the outer parity code is processed in the vertical direction, $D_{64}$ is input to the error correction code generator (not shown) next to $D_0$ at data interval of 64 thereby to generate the error correction code. When the error correction code is generated for the segment 1, the error correction code for the segment 2 is similarly generated, so that data segment having error correction code applied thereto is formed as shown in (B) of FIG. 1.

When the sector is divided into segments as in the first embodiment, error correction can be applied to a long sector thereby making it possible to restrict the variation in the error correction capability within a specified value. Therefore, in the hard disk apparatus of the first embodiment, recording density can be set higher compared to cases where segment division is not carried out.

Also since the product code having internal and outer parity codes is used in the first embodiment, it is made possible to carry out duplex error correction unlike the case of using the reed-solomon code of the prior art shown in (A) of FIG. 10. Therefore, the hard disk apparatus of the first embodiment has high error correcting capability.

When error correction code ECC ($P_0$, $P_1$, ... ) is applied as shown in (B) of FIG. 1, data is divided into a plurality of recording segments as shown in (C) of FIG. 1. The recording segments are set to M sets in the unit of 68-byte data comprising 64-byte data shown in (B) of FIG. 1 with 4-byte error correction code ECC added thereto. At this time, as shown in the drawing, error correcting capability is further improved when a resynchronizing signal is added to prevent phase shift from occurring when changing from bits to bytes due to burst error or the like during data reproduction.

Data is recorded basically in the order of data input as shown in the drawing. When the value of N in (C) of FIG. 1 is set to 8, number M of the last recording segments in the vertical direction becomes 7. In this case, temporary data may be recorded in the recording segment M.

Figure 2:
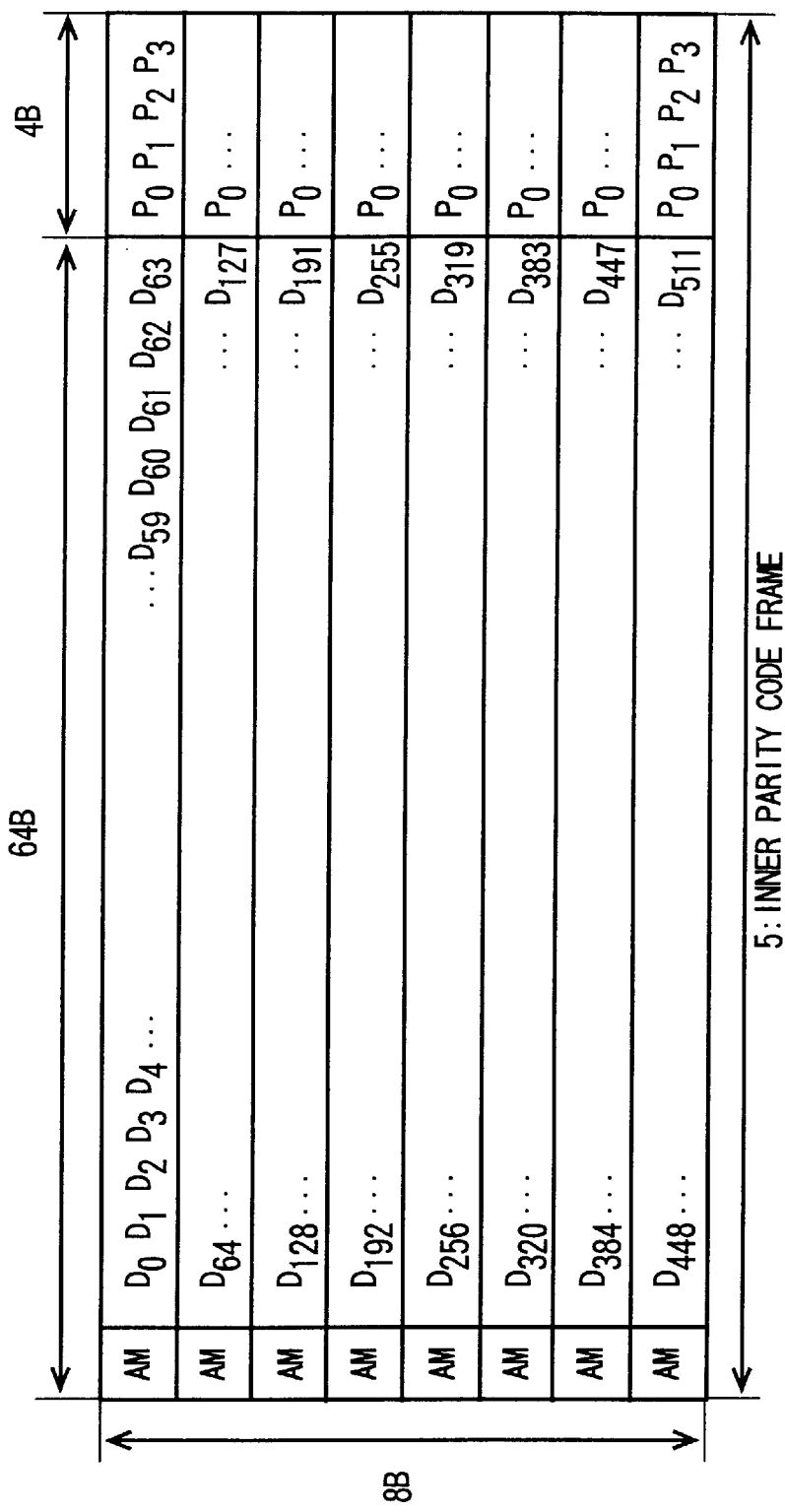
FIG. 2 is a schematic illustration for explaining recording segments of FIG. 1.

Inner configuration of one recording segment when the value of N in (C) of FIG. 1 is set to 8 is shown in FIG. 2. In FIG. 2, total size of the recording segment is 69×8=552 bytes, provided that AM which is the resynchronizing signal is assumed to be one byte. When the size of the recording segment is set to a value near the conventional data sector length of 512 bytes, the recording/reproduction circuit of the prior art can be used. Data is recorded successively in the unit of the inner parity code frame 5 of FIG. 2.

Figure 3:
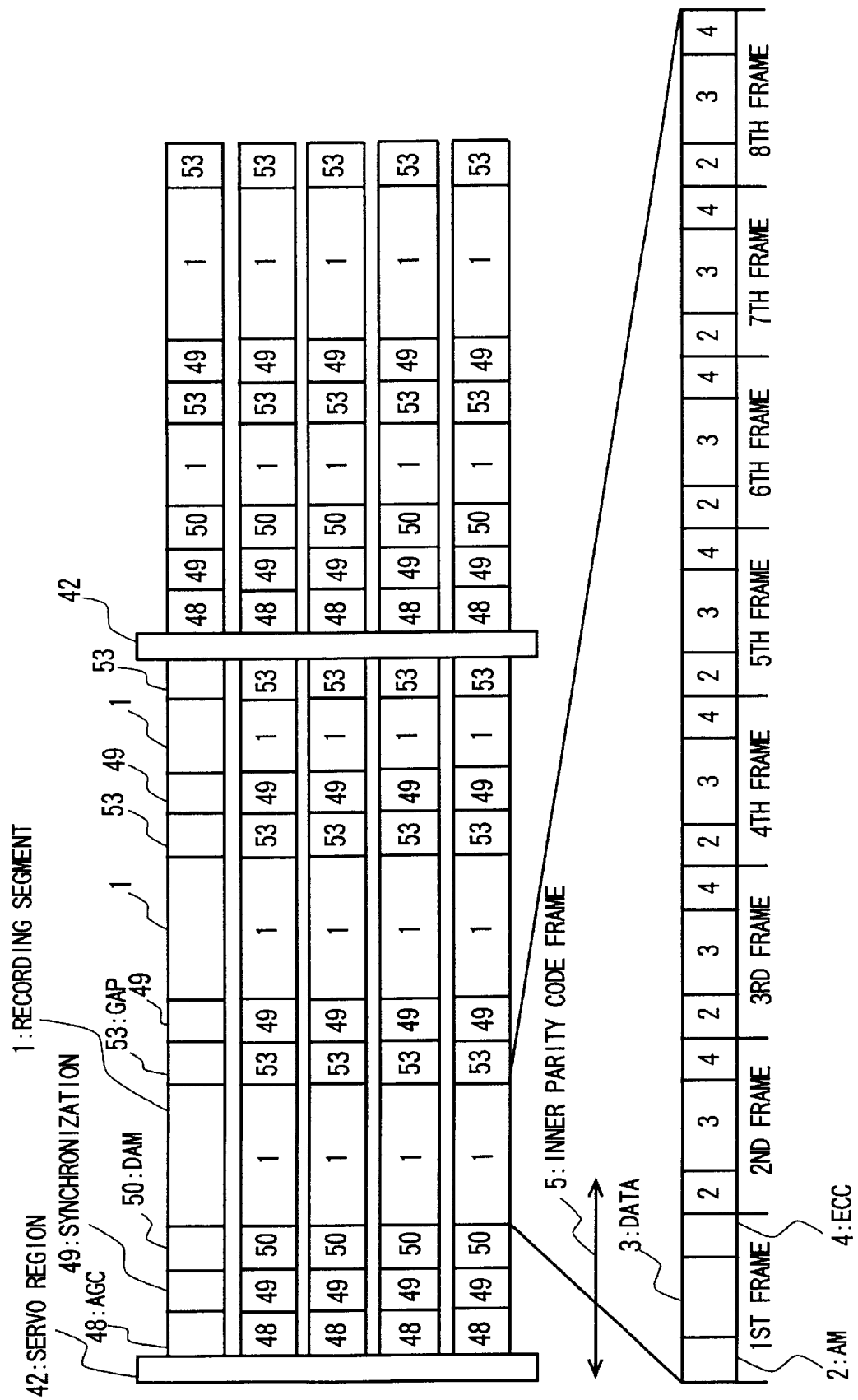
FIG. 3 is a schematic illustration for explaining recording format on the disk medium according to the first embodiment of the present invention.

FIG. 3 shows the state of data recorded in the hard disk which is the recording medium in the first embodiment. In FIG. 3, the AGC region 48 is provided following the servo region 42. In the AGC region 48, a pattern necessary for the AGC circuit after passing the servo sector is recorded. The synchronization region 49 is a region which is necessary for the synchronization with the clock of an electric circuit during reproduction of the recorded data. In the data address mark (DAM) region 50, a code indicating the start of the data is recorded which is used as synchronization signal for demodulating the data which is written in bit unit into byte data. In the case of the first embodiment, demodulation is possible even if the DAM region 50 is omitted because the resynchronizing signal is applied.

A recording segment region 1 is provided next to the DAM region 50. Size of the recording segment 1 is set to correspond to the size of the recording segment shown in FIG. 2. In the case of the first embodiment, data recorded in the actual recording segment 1 is eight inner parity code frames 5 in the combination of the resynchronizing signal (AM2), 64B data (DATA3) and 4-byte error correction code (ECC4). In case the recording segment 1 lies on both sides of the servo region 42, it may be divided by the specified number of bytes similarly to the case of the prior art described with reference to FIG. 9. Reproduction can be processed similarly to the prior art.

The recording format shown in FIG. 3 also has such a feature that random access in the unit of segment is possible in a similar method to the prior art.

In the first embodiment of the present invention, as described above, long sectors are divided into segments and the error correction code of the product code is applied to each segment, while means for dividing the data assigned with the error correction code into recording segments as the unit of recording and reproduction is provided. As a result, the hard disk apparatus of the first embodiment is capable of efficiently applying error correction code of high correcting capability even for long sectors such as video data, and is further capable of making access for recording and reproduction with the same method as that of the prior art.

Although the error correction code is divided to data segments of 4096 bytes in the first embodiment, similar effect can be obtained even when the segment size is arbitrary.

Although the inner parity code is assumed to be the 4-byte error correction code for 64-byte data in the first embodiment, the number of data and the number of error correction codes can be freely set according to the desired data correction capability. At this time, higher error correction capability can be obtained, as the number of error correction codes increases. Similarly, it needs not to say that the same can be said of the outer parity code.

Embodiment 2

Now a magnetic disk apparatus according to the second embodiment of the present invention will be described below by taking reference to the accompanying drawings. In the drawings, components having the same configuration and functions as those of the first embodiment will be referred to by the same numerals and description thereof will be omitted.

The magnetic disk apparatus of the second embodiment employs a method capable of recording data further efficiently than the recording format shown in FIG. 3 of the first embodiment. In the magnetic disk apparatus of the second embodiment, the GAP region 53 and the synchronization region 49 located between the recording segments 1 in FIG. 3 are omitted. Even when made in such a configuration, the magnetic disk apparatus of the second embodiment can record data reliably and make access at a high speed.

Figure 4:
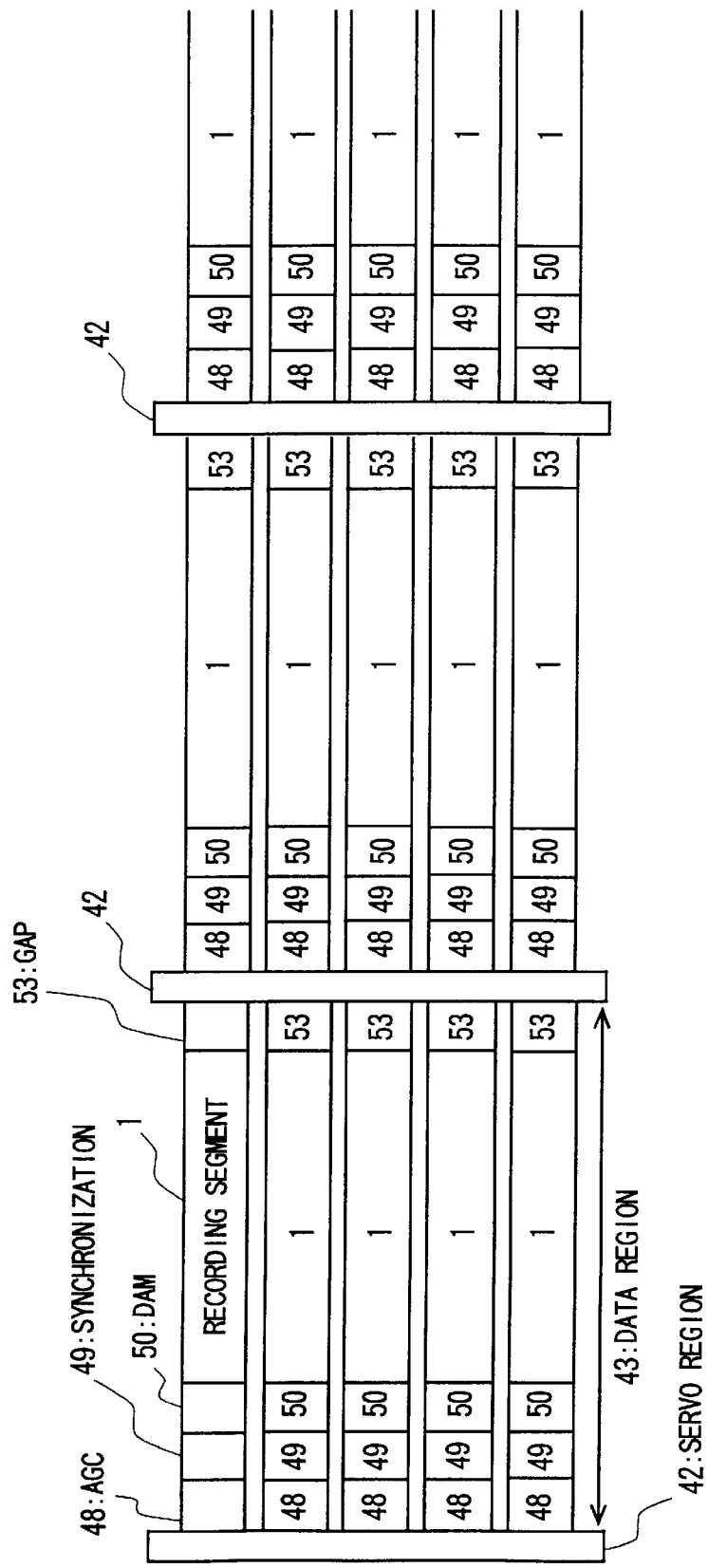
FIG. 4 is a schematic illustration for explaining recording format on the disk medium of the magnetic disk apparatus according to the second embodiment of the present invention.

FIG. 4 shows the recording format in the hard disk apparatus of the second embodiment.

Figure 9:
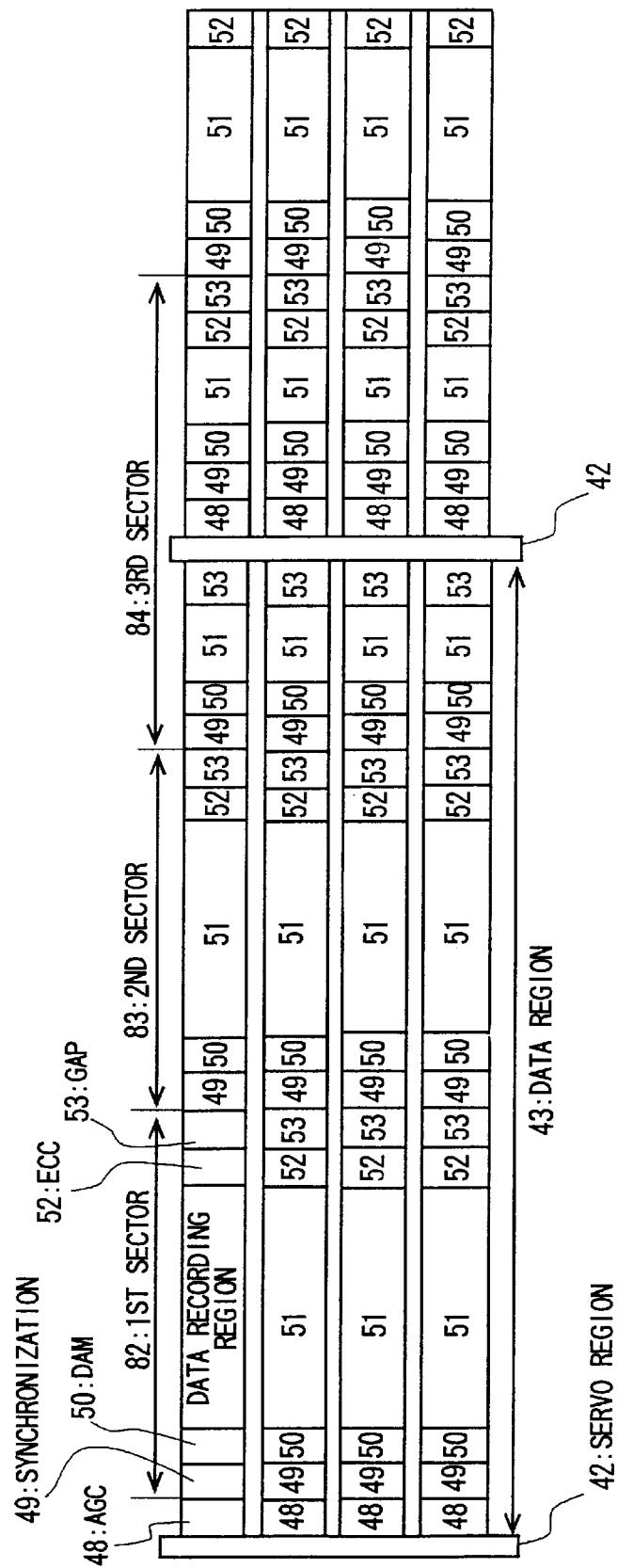
FIG. 9 is the schematic illustration for explaining recording format of the magnetic disk apparatus of the prior art.

As shown in FIG. 4, the data region 43 includes the AGC region 48, the synchronization region 49, the data address mark (DAM) region 50 and the GAP region 53, and these regions are substantially the same as the configuration of FIG. 9 described previously.

What is different in the hard disk apparatus of the second embodiment from FIG. 3 of the first embodiment is that only one recording segment region 1 is provided between two servo regions 42.

Operation of the hard disk apparatus of the second embodiment configured as described above will be described below.

In the hard disk apparatus of the second embodiment, data capacity of the recording segment 1 is generally set so that maximum efficiency can be obtained based on the characteristics of the magnetic head and the hard disk. In the first embodiment, data capacity of the recording segment 1 is set to an integer times the inner parity code frame length. Therefore, when recording by the method described with respect to the recording/reproducing method of the first embodiment in the recording format of the second embodiment shown in FIG. 1, there is such a limitation that the size of the recording segment 1 can be set only in the unit of the inner parity code frame length. For this reason, hard disk apparatus of the second embodiment has a problem that the recording efficiency decreases when recording by such a method.

In order to solve this problem, the second embodiment is configured so that the amount of data which can be recorded in the recording segment 1 can be recognized by such means as an ROM table provided in the hard disk apparatus.

The method of generating the data to be recorded in the recording segment 1 in the second embodiment will be described below.

Figure 5:
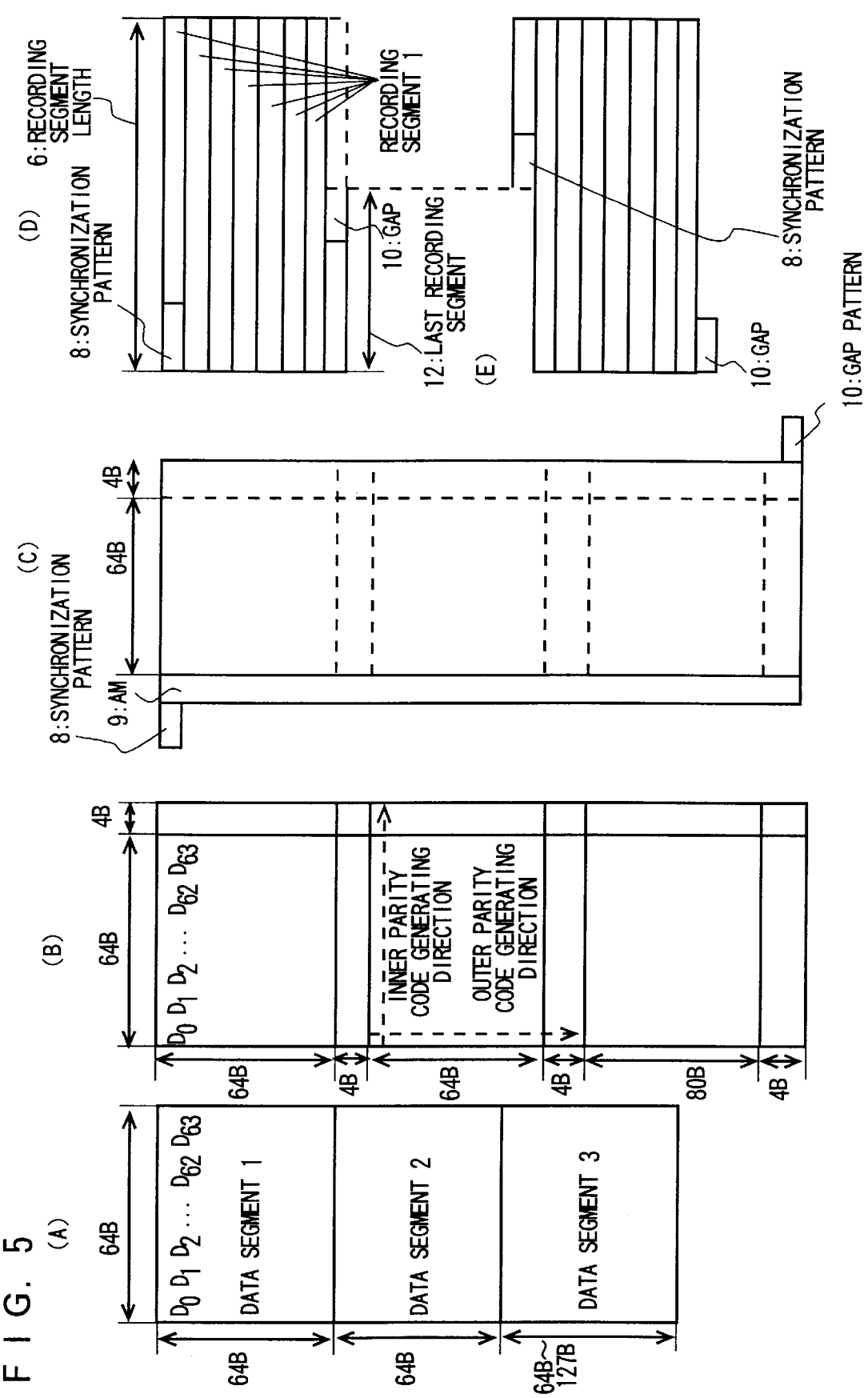
FIG. 5 is a schematic illustration for explaining a method of generating data of the recording segments of FIG. 4.
Figure 6:
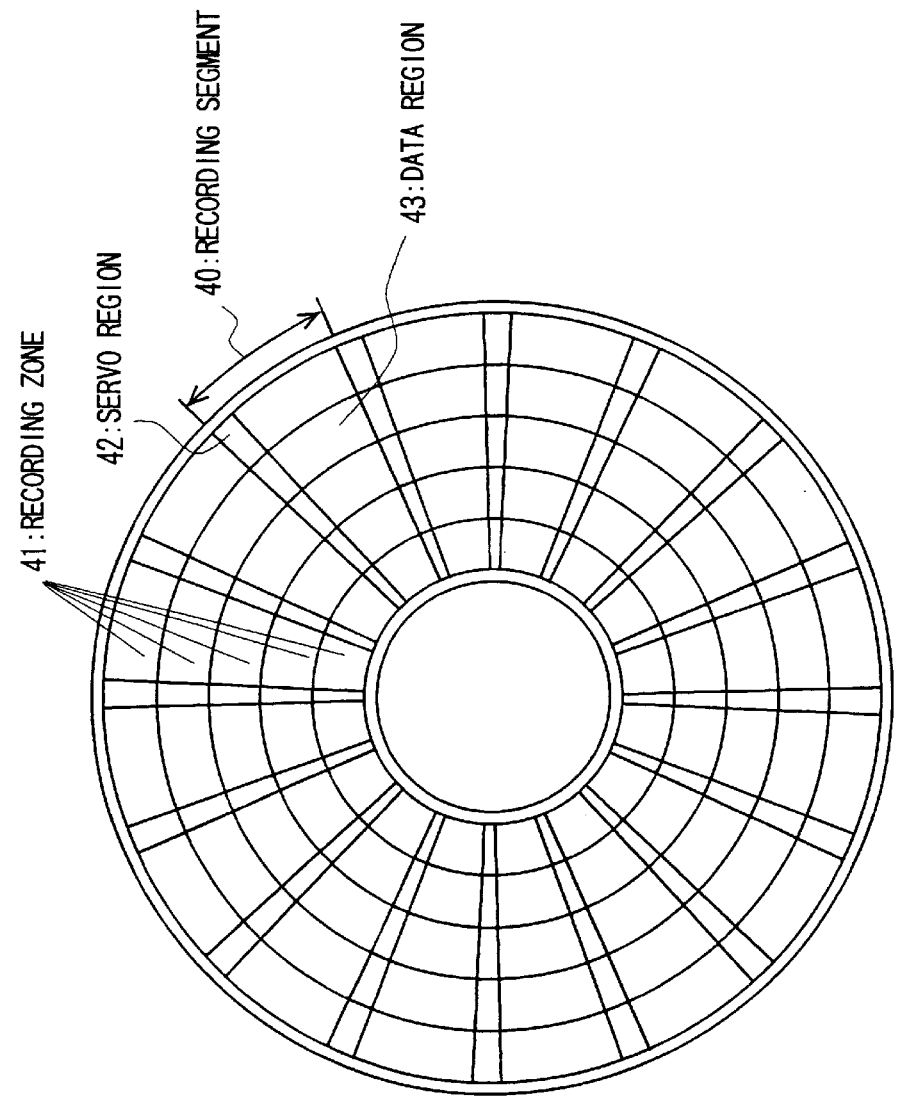
FIG. 6 is the schematic illustration for explaining the method of recording in a magnetic disk apparatus of the prior art.
Figure 7:
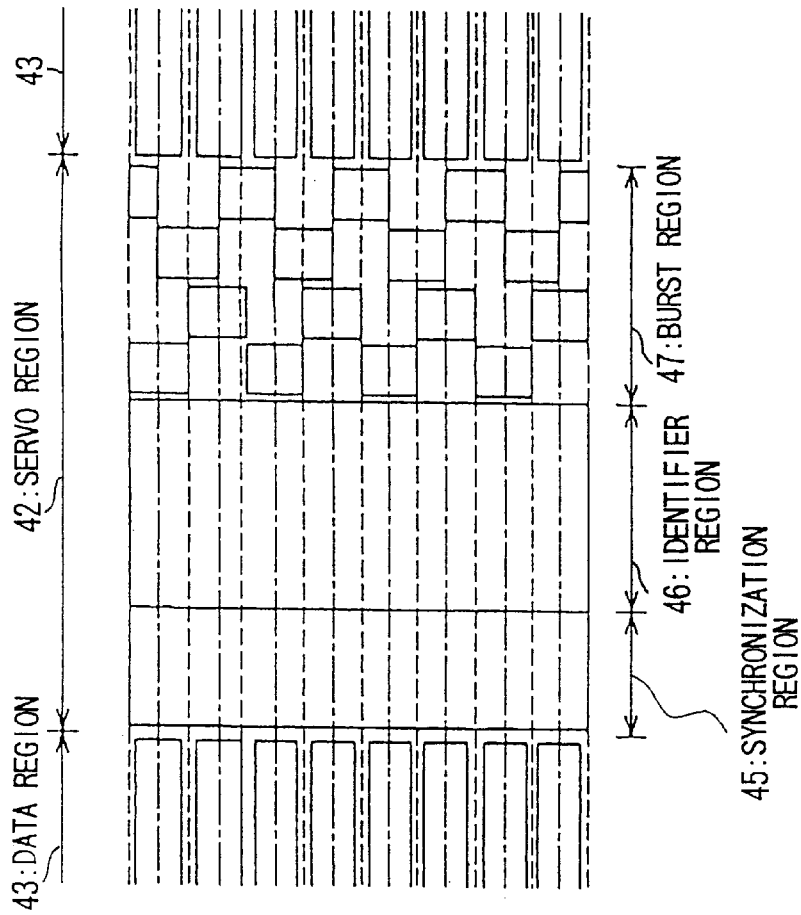
FIG. 7 is the schematic illustration for explaining a servo region of the magnetic disk apparatus of the prior art.
Figure 8:
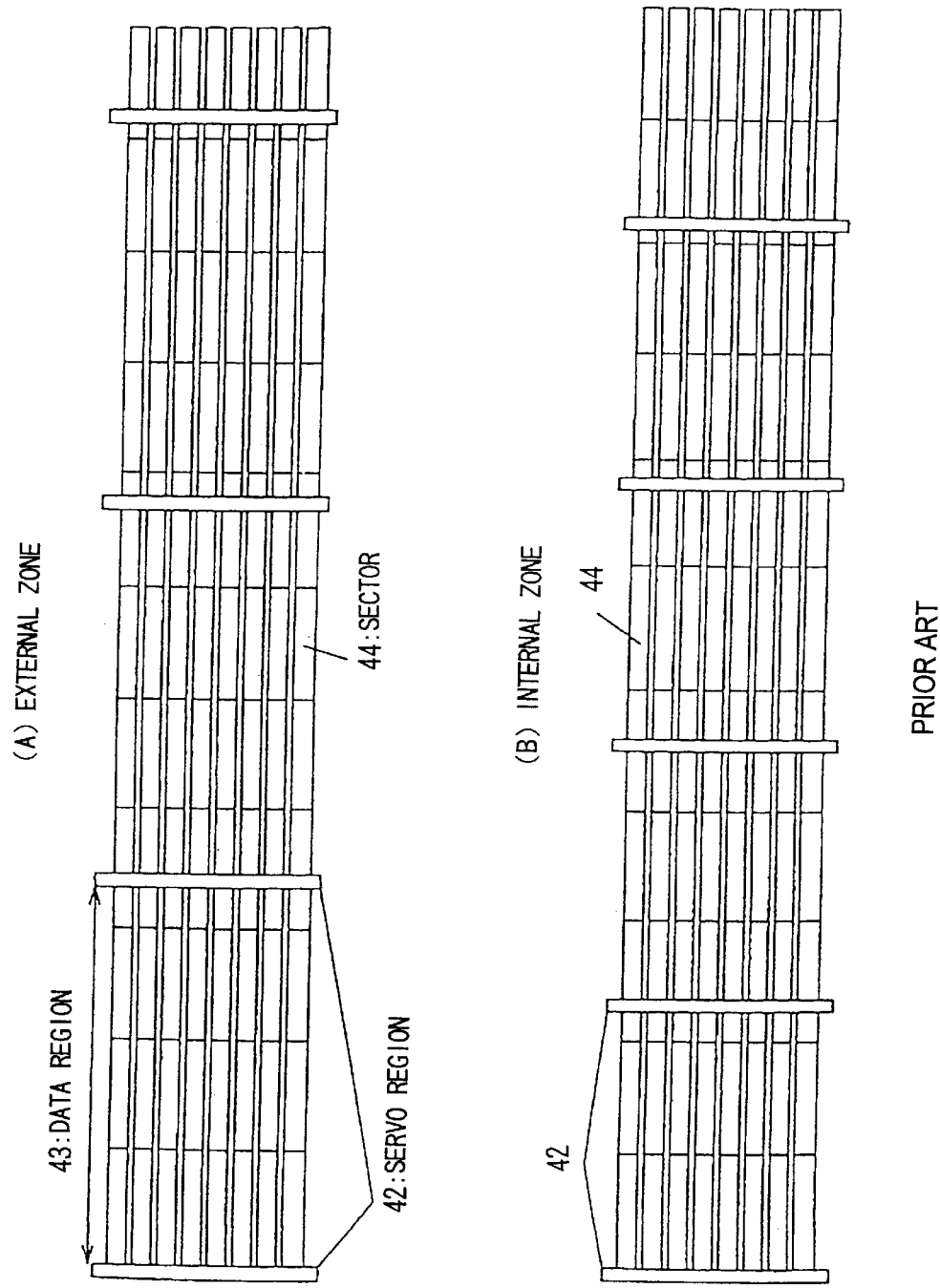
FIG. 8 is the schematic illustration for explaining sectors of the magnetic disk apparatus of the prior art.

FIG. 5 shows the method of generating the data to be recorded in the recording segment 1. The method of generating the error correction code (ECC) is the same as that of first embodiment as shown in (A) and (B) of FIG. 5.

As shown in (C) of FIG. 5, a resynchronization pattern 9 (AM) is assigned to the error correction code and the data and synchronization pattern 8 is applied to the data for PLL restoration. Also a GAP pattern 10 which is a tolerable range for rotation jitter of a motor is added to the end.

Then as shown in (D) of FIG. 5, the data block generated in (C) of FIG. 5 is divided into a plurality of recording segment 1 for each recording segment length 6 having the capacity to record in the recording segment 1 successively from the head. Since the recording segment length 6 is determined according to the characteristics of the magnetic head and the hard disk as described above, last segment of the recording segment 1 does not become the specified segment length. In this case, although the rest of the data may be recorded in a specified pattern, recording efficiency decreases. In order to prevent this problem, in the second embodiment, end position of recording of the last segment can be determined by the following equation (1) from the recording segment length 6 because capacities of the sector data, the error correction code, the resynchronization signal 9 (AM), the synchronization pattern 8 and the GAP pattern 10 are known:

$$K=(D+E+A+S+G) \bmod W \quad (1)$$

(MOD is an operator indicating residue.)
D: Sector data capacity
E: Total capacity of error correction code
A: Total capacity of resynchronization signal
S: Total capacity of synchronization pattern
G: Total capacity of GAP pattern
W: Recording segment length
K: Recording length of last segment Therefore, when recording the next segment, it suffices to divide into segments by setting only the first recording segment to W–K as shown in (E) of FIG. 5. Since the start position of recording in the next recording segment 1 on the hard disk is determined from the value of K which is determined by the equation (1), recording can be done efficiently without creating an ineffective region in the recording segment 1.

While data bits lying on a border of segments are indeterminate, since the GAP region 10 which prevents rotation jitter of a motor is added to the end of the recording segment 1 in the hard disk apparatus of the second embodiment, destruction of data can be prevented even when the subsequent data is recorded. In the hard disk apparatus of the second embodiment, disturbance of the reproduction clock in the PLL circuit due to the border is ceases by receiving the synchronization pattern recorded at the start of data, and therefore data can be reproduced with satisfactory clock.

Start position of any sector can be determined by the following equations (2) and (3) assuming the sector number to be reproduced L.

$$J=L\times(D+E+A+S+G)/W \quad (2)$$

$$M=(L\times(D+E+A+S+G)) \bmod W \quad (3)$$

J: Servo region 42 position with respect to start position
M: Number of bytes of recording segment 1

In the second embodiment, as described above, start position of a sector can be known by a simple arithmetic operation and the sector length is known, and therefore any sector can be accessed.

Even when the recording segment length 6 is different between the inner circumference and the outer circumference, making such a configuration as the information is obtained from a ROM table or other means makes it possible to determine it through arithmetic operation.

As described above, the second embodiment is capable of recording data efficiently by employing such a configuration as one recording segment is placed in each data region and by diving the recorded data into segment with this segment length.

While the error correction code is divided to data segments of 4096 bytes in the first embodiment, similar effect can be achieved even if the segment size is arbitrary.

While the inner parity code is assumed to be 4-byte error correction code for 64-byte data in the first embodiment, the number of data and the number of error correction codes can be freely set according to the data correction capability. At this time, higher error correction capability can be obtained as the number of error correction codes increases. Similarly, it needs not to say that the same can be said of the outer parity code.

Also, recording segment division is carried out by adding the AM pattern 9 in (C) of FIG. 5 in the second embodiment, although efficient recording can be achieved without the AM pattern.

According to the invention, as described above, such means are provided for applying the error correction code by dividing sector data into segments and further dividing the data including the error correction code into recording segments, then recording the data onto the disk. With this configuration, the magnetic disk apparatus of the present invention is capable of correcting errors efficiently even for a large sector size such as video data, thereby improving the reliability of data, and is further capable of easily processing sectors of variable length.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A magnetic disk apparatus comprising;

a disk medium having a data region for magnetically recording and reproducing user data and a servo region for positioning a magnetic head which records and reproduces said user data, and both regions being provided on the same plane; and sector processing means having an error correction code generator which generates error correction codes based on a product code and records or reproduces data for each sector size which is the unit of recording and reproducing said user data.

2. The magnetic disk apparatus in accordance with claim 1, wherein said sector processing means has means for specifying the sector size by means of an external apparatus.

3. The magnetic disk apparatus in accordance with claim 1, wherein said sector processing means has dividing means for dividing data of sector size into a plurality of segments and error correction code generating means for generating error correction code for each of the segments.

4. The magnetic disk apparatus in accordance with claim 3, wherein said dividing means has segment division information of predetermined H bytes and sets data of sector size in one segment when the sector size is less than twice the value of H, and divides data into at least one H-byte segment and one segment which is not less than H bytes and less than twice the value of H when the sector size is not less than twice the value of H.

5. The magnetic disk apparatus in accordance with claim 4, wherein H is 4096 bytes.

6. The magnetic disk apparatus in accordance with claim 1, wherein said error correction code generating means has an inner parity code generator which generates M-byte error correction code for every predetermined N bytes of said user data successively from the start of said user data and an outer parity code generator which generates K-byte error correction code by using said user data skipping N bytes of user data.

7. The magnetic disk apparatus in accordance with claim 6, wherein the value of N is 64.

8. The magnetic disk apparatus in accordance with claim 6, wherein the value of M is 4.

9. The magnetic disk apparatus in accordance with claim 6, wherein the value of K is 4.

10. The magnetic disk apparatus in accordance with claim 6, wherein said outer parity code generator generates error correction code for I-byte data.

11. The magnetic disk apparatus in accordance with claim 10, wherein the value of I is not less than 16 and the value of N is 64.

12. The magnetic disk apparatus in accordance with claim 1, wherein said sector processing means has a recording/reproduction segment dividing section which divides data including the error correction code generated by said error correction code generator and data of the sector size into a plurality of recording/reproduction segments and a recording/reproduction section which records and reproduces data onto a disk medium in the unit of the recording/reproduction segment.

13. The magnetic disk apparatus in accordance with claim 12, wherein said disk medium is divided into a plurality of data segments to have substantially the same angles in the rotating direction, and each data segment has a servo region and a data region divided in the rotating direction, while the length of recording/reproduction sector is the data length recorded in the data region.

14. The magnetic disk apparatus in accordance with claim 12, wherein the data divided by the recording/reproduction segment dividing section includes a resynchronization signal.

15. The magnetic disk apparatus in accordance with claim 12, wherein said disk medium is divided into a plurality of data segments to have substantially the same angles in the rotating direction, and each data segment has a servo region and a data region divided in the rotating direction, while being further divided into a plurality of zone regions in the radial direction, so that larger amount of data is recorded in the data region in the outer zone and the length of recording/reproduction segment is the same over the entire disk medium.

16. The magnetic disk apparatus in accordance with claim 12, wherein the data divided by the recording/reproduction segment dividing section includes information required for dividing a plurality of sectors.

17. The magnetic disk apparatus in accordance with claim 16, wherein the information required for dividing the plurality of sectors includes at least clock synchronization information and recording gap information.

* * * * *